United States Patent

Hart

[11] Patent Number: 6,043,172
[45] Date of Patent: Mar. 28, 2000

[54] CERAMIC FIBER INSULATION MATERIAL

[75] Inventor: Charles M. Hart, New Castle, Pa.

[73] Assignee: Global Consulting, Inc., New Castle, Pa.

[21] Appl. No.: 09/006,892

[22] Filed: Jan. 14, 1998

[51] Int. Cl.$^7$ ................................................... C04B 13/00
[52] U.S. Cl. ........................ 501/95; 501/95.1; 252/62; 264/DIG. 19
[58] Field of Search ................................ 252/62; 501/12, 501/95.1; 264/DIG. 19

[56] References Cited

U.S. PATENT DOCUMENTS

| | | |
|---|---|---|
| 3,116,053 | 12/1963 | Ericsson . |
| 3,793,041 | 2/1974 | Sowman . |
| 3,802,495 | 4/1974 | Hardis . |
| 3,935,060 | 1/1976 | Blame et al. . |
| 4,040,847 | 8/1977 | Miiller ................................. 501/95.1 |
| 4,640,848 | 2/1987 | Diaz et al. ............................. 427/426 |
| 4,797,378 | 1/1989 | Sowman ................................ 501/95.1 |
| 5,017,316 | 5/1991 | Sowman ................................ 501/95.1 |
| 5,053,362 | 10/1991 | Chi et al. .............................. 501/95.1 |
| 5,155,070 | 10/1992 | Skorupa . |
| 5,198,282 | 3/1993 | Baker et al. ........................... 428/114 |
| 5,205,398 | 4/1993 | Hart et al. . |
| 5,355,996 | 10/1994 | Hart . |
| 5,378,219 | 1/1995 | Hart et al. . |
| 5,556,689 | 9/1996 | Kratel et al. .......................... 428/137 |
| 5,569,343 | 10/1996 | Garriques ................................ 156/89 |
| 5,587,228 | 12/1996 | Baker et al. .......................... 428/34.5 |
| 5,624,613 | 4/1997 | Rorabaugh et al. ..................... 264/44 |
| 5,709,639 | 1/1998 | Hart et al. . |
| 5,753,573 | 5/1998 | Rorabaugh et al. ..................... 501/94 |
| 5,789,075 | 8/1998 | Frank et al. ......................... 428/312.6 |
| 5,849,650 | 12/1998 | Rorabaugh et al. ..................... 501/80 |
| 5,858,289 | 1/1999 | Hart ...................................... 264/86 |
| 5,877,100 | 3/1999 | Smith et al. ........................... 501/12 |

*Primary Examiner*—Paul Marcantoni
*Attorney, Agent, or Firm*—John J. Freer

[57] ABSTRACT

A ceramic fiber insulation material is disclosed. It is prepared from a precursor blend generally comprising a gelled colloid and a ceramic fiber filler. Other filler, e.g., other fiber of refractory material, is contemplated, particularly when mixed with ceramic fiber. The gelled colloid ban be formed such as by mixing a gelling agent with a colloid of inorganic oxide or by blending anionic colloid with cationic colloid. The gelling agent is typically nonionic and water-soluble. The blend is trowelable, pumpable and possesses excellent adhesive characteristics including the ability to stick to most surfaces, including metal surfaces. The blend is also virtually shrink-free during drying and, after drying, can provide the insulation material.

12 Claims, No Drawings

CERAMIC FIBER INSULATION MATERIAL

BACKGROUND OF THE INVENTION

1. Field of the Invention

A ceramic fiber insulation material is disclosed that is useful in high temperature applications. There is also taught a method for producing the insulation material.

2. Description of the Prior Art

Insulating materials for use in high temperature applications were historically made from asbestos. Besides its excellent thermal insulative properties, asbestos can be manufactured into various geometric shapes for particular applications. For example, annular discs of asbestos can be used to form an outer insulating cover for high temperature roller conveyors. A roller conveyor can be made with an inner metal shaft and an outer insulating cover. The asbestos discs are stacked onto the shaft, and pressed together axially, as discussed, for example, in U.S. Pat. No. 3,802,495. The discs can also be pressed together by hydraulic means as taught in U.S. Pat. No. 3,116,053. Asbestos, in conjunction with a binder, may be formed into numerous shapes besides annular discs, e.g., board product or end caps for furnaces. The health consequences of asbestos exposure has created a need for asbestos-free insulation.

Ceramic fiber has been successfully used as a replacement for asbestos in certain applications. For example, it is taught in U.S. Pat. Nos. 5,205,398 and 5,378,219 to use ceramic fiber as a roll cover. Annular discs of bulk ceramic fiber are stacked onto an inner metal shaft and may be axially compressed at greater than about 50 percent of the fiber's original density. The compressed discs on the metal shaft may be perfused with colloidal silica and dried. The discs are then recompressed and held permanently in compression. Insulating roll covers produced by this process can offer improved insulating properties over asbestos and are substantially free of fugitive binders. The resulting product can have a density above about 40 pounds per cubic foot. A variation of this technology, as described in U.S. Pat. No. 5,355,996, obtains improved wear resistance by periodically sandwiching perforated, rigid, metal discs between the ceramic discs.

Ceramic fibers have also been used as a replacement for asbestos in those areas requiring complex shapes. Fiber is commonly blended with a suitable binder to produce a mixture. A vacuum draws the fiber and colloidal mixture into a mold and substantially removes the binder. A porous fiber product remains. This technology permits ceramic fiber components to be fashioned into various shapes. However, unlike compression techniques, vacuum-forming does not compact the ceramic fibers to a high density and may not imbue the article with desirable strength. The resultant product is of low density, typically no more than 18 pounds per cubic foot. The surface of the product is rigid, but the interior may be weak and friable. Attempts have been made to improve the strength of vacuum-formed articles, e.g., by forming the article around an internal metal mesh.

Despite these improvements in ceramic fiber insulation technology, there is still a need in the industry for an improved, asbestos-free, insulating material, which may be fashioned without compression into a wide variety of shapes yet retain the ruggedness and long service life of asbestos. Current technologies, which compress ceramic fiber, possess excellent properties but cannot easily be fashioned into complex shapes. Vacuum-formed, ceramic fiber articles may be formed into various shapes but lack the strength and durability of articles formed by compression.

SUMMARY OF THE INVENTION

The present invention describes a new insulating composition which combines the ruggedness of compressed fiber with the fabrication ease of a fiber slurry. Most always the new insulating blend comprises a gelled colloid blended with ceramic fiber filler. The use of other fillers, which fillers may be in combination with the ceramic fiber filler, is also contemplated. The blend may be applied to a surface, such as troweled onto a metal surface, or molded into complex shapes. After drying, the resultant ceramic fiber insulation material possesses excellent insulative properties in high temperature applications, and possesses a surface exhibiting retarded wetting by molten metals, such as zinc and aluminum.

In a first aspect, the invention pertains to a ceramic fiber insulation blend comprising a gelled colloid and an at least substantially ceramic fiber filler, which insulation blend comprises between about 10 weight percent and about 40 weight percent of the ceramic fiber filler and between about 60 weight percent and about 90 weight percent of the gelled colloid, which gelled colloid has a viscosity above about 5,000 centipoise and comprises a colloid of an aqueous suspension of inorganic oxides.

In another aspect, the invention is directed to the above-described blend wherein the gelled colloid is a colloidal blend of an anionically stabilized colloidal silica and a cationically stabilized colloidal alumina, with the anionically stabilized colloidal silica comprising from about 20 weight percent to about 65 weight percent of the gelled colloid, and the cationically stabilized colloidal alumina comprising from about 35 weight percent to about 80 weight percent of the gelled colloid.

In yet another aspect, the invention generally is directed to the above-described blend comprising a colloid of a metal oxide and a gelling agent, and more specifically such a blend that comprises colloidal silica in mixture with an at least substantially water-soluble, nonionic polymeric gelling agent. In a related aspect, the invention is directed to the above-described blend comprising a colloid of colloidal silica, colloidal alumina, colloidal zirconia, colloidal titania, or their mixtures.

A further aspect of the invention pertains to a blend comprising a gelled colloid and a filler, which gelled colloid is a gelled colloid as more particularly described hereinbefore and which is present in an amount as also described hereinabove. The filler may be blended with ceramic fiber filler or may be other than ceramic fiber filler.

Another aspect of the invention pertains to a method for producing a ceramic fiber insulation blend from an aqueous colloid of an inorganic oxide, which method comprises:

(a) establishing the aqueous colloid in ungelled form and at a viscosity below 5,000 centipoise;

(b) gelling the colloid to a gelled colloid having a viscosity above about 5,000 centipoise; and (c) blending the gelled colloid with an at least substantially ceramic fiber filler in an amount providing between about 10 weight percent and about 40 weight percent of the ceramic fiber filler in the resulting insulation blend.

A still further aspect of the invention is directed to a gelled colloid adapted for blending with a filler to form an insulation blend, the gelled colloid comprising an aqueous suspension of inorganic oxide, with the gelled colloid having a viscosity above about 5,000 centipoise.

Still another aspect of the invention is the ceramic fiber insulating material produced by drying any above-described insulation blend, which material is for use in high temperature applications. Drying typically yields an insulating material having a density within the range between about 20 pounds per cubic foot and about 70 pounds per cubic foot.

As noted hereinabove, the blend may be molded into a shape, or may be troweled onto a surface. It is also pumpable and can be gunnable. Then, the insulating material obtained on drying can be virtually shrink-free.

Other details, objects and advantages of the invention will become apparent in the following description of the present preferred embodiment.

DESCRIPTION OF THE PREFERRED EMBODIMENTS

Most commonly, for providing the insulation blend, fillers will include fibers and the fibers used will be inorganic refractory fibers and contain some ceramic fiber, e.g., from about 20 weight percent to 100 weight percent of the total amount of refractory fiber present, and usually greater than about 50 weight percent will be ceramic fiber. Other refractory fibers may also be used, including synthetic or natural mineral fiber, e.g., synthetic fibers such as glass fiber or carbon fiber, or natural mineral fibers such as sepiolite, wollastonite, mineral wool, including mineral wool with additives, or fiber mixtures including these natural mineral fibers. Because inorganic refractory fiber will most always be some to all ceramic fiber, reference herein to "ceramic fiber" may include all refractory fibers.

It is preferred for economy that a ceramic fiber be a silica-containing fiber; however, the ceramic fiber may be other than a silica-containing fiber, as represented by an alumina fiber or fiber of a boron compound, e.g., fibers of boron oxide, boron carbide or boron nitride. Silica-containing fiber may simply be silica fiber or, as is more usual, the silica may be present with one or more of alumina, zirconia, chromia, or titania. Other fibers may comprise silica nitride, silicon carbide, calcium-aluminum silicate, calcium-magnesium silicate and the like.

It will be understood that the ceramic fiber may be prepared by any process useful for preparing ceramic fiber. Commercially, such processes include those which fiberize a molten stream, e.g., blowing of a molten stream to fiberize the molten material, or causing the molten stream to impact rapidly spinning wheels which fiberizes the melt. Commercial manufacture also includes sol-gel processing, e.g., for high alumina fibers. The commercial ceramic fiber may contain some shot. As used herein, "shot" refers to the non-fibrous, and usually chunky, ceramic particles that are found in accumulated ceramic fiber, e.g., ceramic fiber blanket. Although serviceable fiber can contain shot, the ceramic fiber used herein may also be processed to have a reduced shot content, that is virtually shot-free. A particularly serviceable ceramic fiber for use herein has an $SiO_2$ content of 54 weight percent, an $Al_2O_3$ content of 43.5 weight percent, an $Fe_2O_3$ content of 1.5 weight percent, and 1 weight percent balance of residual oxides.

Typically, ceramic fibers as produced will be accumulated together. Such may simply be formed by, for example, pressing freshly made loose fiber into a container, e.g., a bag for storage or shipment. This pressed-together fiber, which can be referred to as "bulk" fiber, is contrasted with loose fiber, which has no accumulated form. Bulk fiber can have sufficient structure so as to be difficult to separate into loose fiber. Bulk fiber may also comprise fiber accumulated into mats. Fiber mats may have a density from about 2 to about 8 pounds per cubic foot. These mats, often by further consolidation, may be made into blankets that will typically have a density on the order of from about 4 to 10 pounds per cubic foot for ceramic fiber. As bulk fiber, or as mats or blankets, the refractory fiber is simply referred to herein for convenience as being in "accumulated" form. Loose or accumulated fibers may be used in the present invention; however, the fiber material is advantageously first torn apart into discrete fragments of serviceable size, e.g., by milling or hand shredding. The individual fibers may be of any convenient length, but will preferably be less than eight inches long.

Additionally, where the filler is a fiber, it may include organic fibers, and these can include natural and synthetic fibers, e.g., cotton or aramid. Inorganic fibers may include metal, semimetallic, and nonmetal fibers. It is therefore broadly contemplated to use fillers other than ceramic fiber filler. For example, there may be filler utilized herein in addition to fiber filler, and it can be of any shape compatible with the gelled colloid. Such fillers can include particulate fillers, e.g., flakes or powders, as well as chunky-bodied fillers. These specific fillers can include talc, quartz and mica.

Thus, for example, "blends", as such are discussed herein, may be other than ceramic fiber insulation blends. Broadly, a "blend", as the word is used herein, contains a gelled colloid and a filler. The blends that contain ceramic fiber are referred to as "ceramic fiber insulation blends". Other blends, not containing ceramic fiber, may also be insulation blends so long as they lead to dry materials that have insulation property. A material has "insulation property", as such term is used herein, so long as it contains filler and provides at least threshold insulation characteristic, when compared with the same material, but which does not contain the filler.

A gelled colloid, hereafter also referred to as a "gel", may be blended with filler to produce the blend. The gel should be present in the blend in an amount that allows the gel to bind filler particles together as a coherent mixture. The filler, however, must be present in sufficient quantity to impart wet strength to the blend and maintain dry strength in the final insulating material. Where ceramic fibers are used as the filler, the fiber may be present from between about 10 weight percent and about 40 weight percent, basis 100 weight percent of the ceramic fiber plus the gel. Preferably, the blend will contain from about 15 weight percent to about 30 weight percent of ceramic fiber. Use of less than about 10 weight percent of ceramic fiber may be insufficient to impart wet strength to the blend, while use of greater than about 40 weight percent may provide insufficient gel to bind the filler into a coherent mixture in the blend.

The gel comprises a colloid, also referred to herein as a suspension. It is presently known that the gel may be created by two different processes: (1) by mixing a colloid with a gelling agent, or (2) by mixing at least two colloids which have incompatible stabilizing systems. The colloid can be an aqueous colloidal silica, but may also include other aqueous colloids such as of alumina, zirconia, titania, or other metal oxides. Particle sizes of the suspensions for the colloidal solids will usually range from about 4 nanometers to about 100 nanometers. Usually, commercially available suspensions will contain from about 15 weight percent to about 50 weight percent or more of colloidal solids. Ranges on particle sizes and solids content of the suspensions are generally limitations of colloid chemistry and should not be construed to limit the operation of the present invention. However, no limit based on colloid chemistry typically exists on a lower limit of solids content. Commercial suspensions are usually easily diluted to concentrations below 15 weight percent but, advantageously for economy, suspensions of at least 15 weight percent or more are generally used herein.

Colloids may utilize water or non-aqueous solvents as the continuous medium. Most commonly, colloids are water-based and rely on electrostatic repulsion to stabilize colloid particles. Stabilizing systems can include anionic and cationic compounds, which are often dispersed on the surface of the colloid particle. Repulsion of these ionic constituents maintains a separation between colloid particles and prevents the particles from coalescing. For example, silica colloids are frequently sodium or ammonium stabilized. Commercially available silica colloids that are sodium stabilized may typically contain from about 0.3 to about 0.8 weight percent sodium, expressed as $Na_2O$. Such colloids can have a viscosity of from less than 10 centipoise to as much as 50 centipoise or more. It will be appreciated that, for the purposes of this invention, the colloid may comprise an aqueous or non-aqueous solvent and any type of stabilization system. However, for convenience, reference herein to the liquid medium will usually be made simply to "water" or "aqueous medium".

In the present invention, the colloid most typically comprises aqueous, anionically stabilized colloidal silicas such as a LUDOX™ dispersion manufactured by E. I. DuPont de Nemours and company or NYACOLtm dispersion manufactured by Eka Chemicals, Inc. Of Atlanta, Georgia. Other colloids, as mentioned hereinbefore, can include colloidal titania, colloidal zirconia, colloidal alumina as well as mixtures of colloids. A mixture of an aqueous, cationically stabilized alumina colloid with an anionically stabilized silica colloid is of particular interest, as will be more completely discussed hereinbelow. It is to be understood that colloidal compositions such as colloidal silica, particularly commercially available colloids, may also contain additives.

In the first method of producing the gel that is discussed herein, a gelling agent is added to the colloid. The gelling agent is substantially water-soluble. When used with the most typical anionically stabilized colloidal silica, the gelling agent is advantageously nonionic in character. It will be understood that ionic constituents may be present in quantities that do not interfere with the functioning of the gelling agent. By being substantially water soluble, it is meant that the agent may, in a minor weight amount of less than 50 weight percent, be dispersible rather than soluble in water. Most typically, the gelling agent will be a water-soluble, nonionic polymeric agent. Generally, this type of agent will be an organic polymeric agent chosen from the group comprising ethoxylated alcohols, alkylphenol ethoxylates, polyoxyethylene esters, or their mixtures. It will be appreciated that for these organic polymeric agents, there may be substituted other groups, e.g., other alkyl groups such as methyl or propyl functionalities substituted in place of, in whole or in part, an ethyl constituent. Preferably, the nonionic gelling agent is a polyoxethylated alcohol.

The gelling agent will be added to the colloid in an amount to provide from abut 0.3 weight percent to about 20 weight percent of gelling agent in the gelled colloid. Use of less than about 0.3 weight percent of agent may be insufficient for producing the gel, while use of greater than about 20 weight percent of the agent can be uneconomical. Usually, for efficient and economical gel production, there will be used from about 0.4 to about 10 weight percent of the agent, and preferably from about 0.5 to about 5 weight percent of the agent.

Mixing the gelling agent with the colloid produces the gel. It is contemplated that such mixing can be handled by any means for blending ingredients, e.g., liquids, together, such as simple hand mixing or mechanical mixing. Usually, a mixing time of no more than a few minutes, e.g., 2–10 minutes, is needed. Other additional ingredients that may be desired in the gel can be added at this time. The gel can be a homogeneous, high viscosity material substantially free of any grit or clumping. The viscosity of the gel is in excess of at least about 5,000 centipoise, and preferably above about 10,000 centipoise. By comparison, a colloid absent the gelling agent typically has a viscosity below about 50 centipoise. The resulting gel may then be blended with filler by any means for mixing a particulate solid with a liquid medium, e.g., the gel may be mechanically blended with filler to produce the blend.

In the second method of producing the gel that is discussed herein, at least two colloids are mixed together to create the gel. It is contemplated that the colloids can be mixed together by any means for combining liquid materials. During this combining, other substituents that may be desired in the gel can be added. The colloids that are combined may be stabilized using either anionic or cationic stabilizers. Anionic colloids are typically supplied at a pH above about 9, and cationic colloids normally have a pH below about 5. The stability of each suspension is strongly dependent on pH, i.e., lowering/raising the pH of an ionic/cationic suspension will destabilize the colloid resulting in a coagulant. It can be expected, therefore, that blending an anionic suspension with a cationic suspension will destabilize both suspensions.

It has however been found that mixing an anionically stabilized colloid with a cationically stabilized colloid may produce a gel, which is useful for providing the insulation blend, as opposed to producing a coagulant. For example, an anionically stabilized colloidal silica, typically having a pH of around 9, may be blended with a cationically stabilized colloidal alumina, typically having a pH of around 5, to produce a useful gel. Blending the two colloids will lower the pH of the silica colloid and raise the pH of the alumina colloid; therefore, both colloids will destabilize and form a gel. The critical pH where this occurs is within the range from about 5 to about 7.5. This corresponds to about 20 weight percent to about 65 weight percent colloidal silica, where the remainder is colloidal alumina, i.e., 35–80 weight percent colloidal alumina. It will be understood that the particular pH where gelation will occur can depend on factors which include the amount and the particular colloids used as well as their particular stabilization systems. The gel thus produced may also be blended with filler to produce a suitable blend, e.g., blended with ceramic fiber filler to produce a ceramic fiber insulation blend.

A blend of silica and alumina colloids is a preferred colloidal blend, not only for economy but also because the alumina substantially inhibits crystobalite formation compared to use of the silica colloid alone. Moreover, the inhibition is desirably synergistic. For example, a product made from 100 percent silica colloid and exposed to an elevated temperature of 2350° F. was found to contain about 54 weight percent crystobalite. Then, a product with only 23 weight percent silica, or only about one-quarter of the 100 percent silica colloid, was expected to have only about one-quarter, or over 13 weight percent crystobalite. However, the product was found to contain only 6.6 weight percent crystobalite.

The blend of gelled colloid plus filler, or even just the gel, can be readily applied to a substrate. It is trowelable, pumpable and can be gunnable. The blend, or just the gel, may be poured, pressed or otherwise formed into a variety of shapes. After application, drying of the blend produces the resulting material, e.g., drying of a ceramic fiber insulation blend produces a ceramic fiber insulation material. Where water is the liquid medium of the colloid of the gel, drying can generally proceed at a temperature above about 70° F. It can be advantageous for efficient manufacture of a finished product for drying to occur at an elevated temperature, and preferably at a temperature well above the boiling point of the liquid medium. Thus, where water is the continuous phase of the colloid, drying is preferably conducted at a temperature within the range of from above 212° F. up to about 400° F., but can be more, e.g., up to 500° F. or more.

Drying time is dependent upon several factors, for example, the thickness of the insulation blend as applied, type of drying oven, humidity, and air flow. A suitable drying schedule for an applied blend of one inch thickness may be from about 15 to about 24 hours. Thicker materials may require even longer drying times. "Dryness", as the word is used herein, may be dryness to the touch, but, preferably, dryness is determined by weighing the material to assess the quantity of water that has evaporated. The blend has minimal shrinkage during drying and the resulting material can exhibit strong adhesion to a wide variety of surfaces, including rubber, wood, and metals such as iron alloys like steel.

The ceramic fiber insulating material has excellent thermal insulative properties at high temperature, such as at 2200° F. or more. For example, an insulating material produced from a blend of alumina colloid with silica colloid, which contains ceramic fiber produced by sol-gel processing, may exhibit serviceability up to 3000° F. The insulating material is substantially shrink-free at elevated temperature, e.g., virtually completely shrink-free up to about 1800° F. with on the order of about ¼% to 1% shrinkage per 100° F. of temperature beyond that. Minimal shrinkage can be achieved by heat processing the fiber. An insulating material, such as made from a ceramic fiber insulation blend of a silica colloid and a gelling agent, can have desirable mechanical properties, e.g., a desirable modulus of rupture. The ceramic fiber insulating material can have a density between about 20 pounds per cubic foot and about 70 pounds per cubic foot, which is comparable to the density of very highly compressed ceramic fiber. The final density for a dried material can be affected, for example, by the size and shape of the filler used. Dense particulate fillers of small average particle size that might be used to produce the blend, can yield a dense material.

Unlike other ceramic fiber insulating products which require conventional binder, e.g., cement, or starch, or clays, the ceramic fiber insulating material herein produced is preferably prepared to be free of such binders. If such binders are imparted to the blend, e.g., during mixing to prepare the blend, the binders used are typically present in minor amount and are most usually organic binders such as starch, latex materials and cellulosic materials. It will be understood, however, that other ingredients may be present in the blend, as well as in the final material. Such substituents might be present with the filler, as a lubricant contributed by a fiber filler. Or additional ingredients can be imparted by the colloid, such as stabilizers, pH adjusting agents and coupling agents. Also, such ingredients can be purposefully added, such as dyes or colorants. Usually, all such substituents and ingredients will be present in the material in very minor amount, e.g., contribute less that 5 to 10 weight percent of the material.

The insulating material may be used in applications such as roll covers, board or block-shaped products, and where more complex shapes are required. As a roll cover, the insulation material exhibits excellent longitudinal crack resistance. When formed into pieces of complex shapes, the pieces can be substantially homogeneous. Both the surface and interior of the pieces can be resistant to wear, and the interior can be resistant to crumbling.

The following examples show how the invention has been been practiced but should not be construed as limiting the invention. Numerous modifications and variations of the present invention are possible in light of the above teachings. It is therefore to be understood that within the scope of the appended claims, the invention may be practiced otherwise than as specifically described herein.

EXAMPLE 1

Into a container there was provided Nyacol 9950, an aqueous colloidal silica having a solids content of 50 weight percent, a viscosity of about 15 centipoise, a pH of 9.0, a specific gravity of 1.4, and an average particle size of about 100 nanometers. A gelling agent was mechanically stirred into the colloidal silica using moderate agitation for a time of ten minutes. There was used 35 ml of the gelling agent with 3800 ml of the colloidal silica. The gelling agent was a clear, free-flowing liquid of polyoxyethylated (6) decyl alcohol with about 10 volume percent of water. This was a water-soluble, nonionic polymeric agent having a specific gravity of 1.0 and manufactured by Buntrock Industries. By such mixing, the gelling agent was thoroughly blended with the colloidal silica to form a smooth, homogeneous and substantially grit-free gel. The viscosity of the gel was judged to be in excess of 10,000 centipoise.

A commercial ceramic fiber in bulk form, manufactured by Unifrax Corporation under the trade name Lo-Con™, was selected. This ceramic fiber contained 50 weight percent alumina and a balance essentially of silica. The bulk fiber was separated by hand into discrete fragments, and was then admixed by mechanical blending with the gel for approximately 20 minutes. The ceramic fiber was used at a weight ratio of 1 part fiber to 6 parts gel. By this blending, the ceramic fiber was uniformly dispersed throughout the resulting blend so that the blend was virtually free of any undispersed ceramic fiber. The resultant insulation blend was judged to be pumpable.

A first portion of this blend was stored in an airtight container for 90 days, after which the container was opened and the blend was visually observed to have retained the same uniformity as was originally present and was thus judged to be as serviceable as the freshly prepared blend. No data was collected for storage greater than 90 days; although, a shelf life of six months or more was considered likely.

A second portion of the freshly prepared blend was applied, by troweling, onto a flat surface of a steel plate. The blend readily adhered, in the manner of an adhesive, to the underlying substrate. The insulation blend was applied in a sufficient amount to provide about a 1 inch thick layer on the substrate. After application, the insulation blend was dried at a temperature of about 350° F. for a period of about 24 hours. In drying, the blend was seen to be virtually shrink-free, that is, it retained nearly the same dimensions as when freshly applied. The resulting insulating material was white in color, porous, free of visible imperfections, and possessed a scratch-resistant surface. The surface yielded slightly, however, to manually applied pressure. The insulating material had a final density of 47 pounds per cubic foot. The insulating material was judged to be serviceable up to a temperature of 2200° F.

EXAMPLE 2

Into a container there was provided the Nyacol 9950, as described hereinbefore in Example 1, which is an anionically stabilized, aqueous colloidal silica utilizing a sodium stabilizing ion. Into the same container was blended an equal amount by weight of Wesbond D3070, a cationically stabilized, aqueous colloidal alumina having a nitrate stabilizing ion. This colloidal alumina had a solids content of 30 weight percent, a pH of about 4.5, a typical viscosity of about 10 centipoise, and a particle size of 70 nanometers. Blending of the two colloids proceeded in the manner as described in Example 1 and produced a smooth, and substantially grit-free gel, having a viscosity above 5,000 centipoise. The gel had a final pH of about 7.

The same procedure used in Example 1 was used here to form the insulation blend, except that the ceramic fiber filler:gel ratio was 1:5 instead of 1:6 as in Example I. The resultant insulation blend was trowelable and pumpable. Application to a steel plate and drying of the insulation blend was accomplished as in Example 1. The physical properties of the dried insulative material were similar to that found in Example 1. This insulating material was also judged serviceable up to 2200° F.

EXAMPLE 3

Into a container there was provided Nyacol 9950 which is the aqueous colloidal silica described hereinbefore in Example 1. A gelling agent was blended with this colloidal silica in the manner as discussed in Example 1. There was used 75 ml of the gelling agent to 10 liters of the colloidal silica, providing about 0.48 weight percent of the gelling agent. The gelling agent was the water-soluble, nonionic polymeric agent described in Example 1. This blending produced a smooth gel having a viscosity in excess of 5,000 centipoise.

The same procedure used in Example 1 was used here to form the insulation blend, except that the ceramic fiber filler:gel ratio was 1:3 instead of 1:6. The resultant insulation blend was hand molded into a perforated metal mold. The blend was then subjected to a slight pressure to force out entrapped air and was then dried by the procedure used in Example 1. Upon release from the mold, there resulted a test bar of ceramic fiber insulation material measuring 1"×1"×8".

Resistance of the test bar to molten aluminum was conducted in a vacuum induction furnace. Solid ingots of aluminum were placed inside an alumina crucible in the bottom of the furnace. The test bar was suspended above the metal, by attachment to a refractory metal fixture. The shaft of the fixture extended through the lid, and was connected to a low speed electric drive unit. The furnace was closed and a cover of flowing argon gas was forced through the furnace throughout the test. The furnace was heated to 850° C. to melt the aluminum and the test bar was lowered partially into the melt. Then the motor was turned on to rotate the test bar through the aluminum at approximately 15 rpm. After four hours, the test bar was raised out of the melt and the power was turned off. The test bar was left to cool overnight inside the closed furnace. For the test, the aluminum alloy chosen contained, by weight, 5.1 to 6.1% zinc, 2.5 to 3% Mg, 1.2 to 1.6% Cu, 0.18 to 0.28% Cr and a balance of aluminum.

As a control, there was also tested in the same manner a bar of a commercially available ("standard") fused silica. After the test, it could be seen that the standard fused silica cracked extensively. By comparison, the bar of the ceramic fiber insulation material held up very well in the molten aluminum with no visible external cracking.

The bars were then sawed lengthwise to provide a freshly cut surface for visually determining the amount of aluminum penetration. The standard fused silica appeared to be the least desirable, showing the most aluminum penetration. The maximum metal penetration that could be seen on the sawed surfaces is shown in the table below:

TABLE

| Sample | Aluminum Penetration |
| --- | --- |
| Standard Silica Control | 1/8" |
| Ceramic Fiber Insulation Material | 1/16" |

The sawed surfaces of the test samples also showed that the ceramic fiber insulation material had a desirable, substantially non-porous internal structure.

I claim:

1. A method for producing a ceramic fiber insulation blend from an aqueous colloid of an inorganic oxide, which method comprises:
   (a) establishing said aqueous colloid in ungelled form; and next
   (b) gelling the colloid to a gelled colloid; and then
   (c) blending the gelled colloid with an at least substantially ceramic fiber filler in an amount providing between about 10 weight percent and about 40 weight percent of the ceramic fiber filler in the resulting insulation blend.

2. The method of claim 1 wherein said aqueous colloid is established in an ungelled form at a viscosity of below about 50 centipoise and said aelled colloid has a viscosity above about 5,000 centipoise.

3. The method of claim 1 wherein gelling of said colloid occurs by blending an anionically stabilized colloid of an inorganic oxide together with a cationically stabilized colloid of an inorganic oxide.

4. The method of claim 3 wherein gelling of said colloid occurs by blending an anionically stabilized colloidal silica with a cationically stabilized colloidal alumina.

5. The method of claim 4 wherein said gelled colloid is blended with a ceramic fiber filler produced by sol-gel processing for preparing an insulation material having thermal insulative properties up to about 3000° F.

6. The method of claim 1, wherein gelling of said colloid occurs by blending said aqueous colloid of an inorganic oxide together with a gelling agent.

7. The method of claim 1 wherein said gelled colloid is blended with said ceramic fiber filler by admixing said filler with said colloid.

8. The method of claim 7 wherein said filler is admixed with said colloid by mechanical agitation providing an at least substantially uniform blend of said filler in said colloid.

9. The method of producing a ceramic fiber insulation material comprising drying the insulation blend of claim 1.

10. The method of claim 9 wherein drying proceeds at a temperature within the range of from about 70° F. to about 500° F.

11. The method of producing a ceramic fiber insulation material of reduced cristobalite content comprising drying the insulation blend of claim 4.

12. The method of claim 1, wherein said aqueous colloid is established in an ungelled form at a viscosity of below about 5,000 centipoise and said gelled colloid has a viscosity above about 10,000 centipoise.

* * * * *